UNITED STATES PATENT OFFICE.

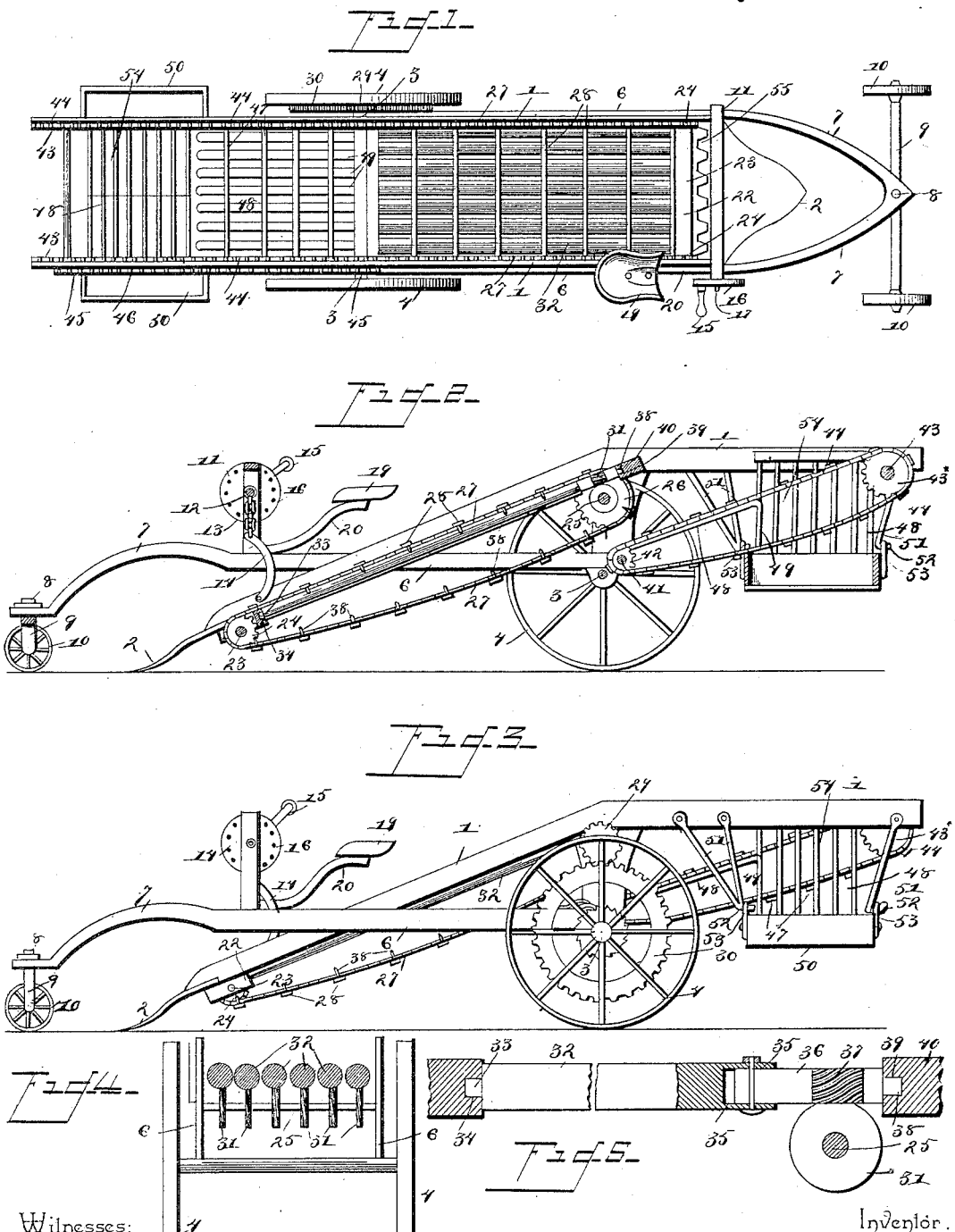

GEORGE ARTHUR ELLSWORTH, OF YORK, OHIO.

POTATO DIGGER AND PICKER.

SPECIFICATION forming part of Letters Patent No. 432,992, dated July 29, 1890.

Application filed January 8, 1890. Serial No. 336,312. (No model.)

*To all whom it may concern:*

Be it known that I, GEORGE ARTHUR ELLSWORTH, of York township, Sandusky county, Ohio, have invented an Improvement in Potato Diggers and Pickers, of which the following is a specification.

This invention has relation to potato diggers and pickers, and among the objects in view are to provide a machine of the above class which shall be cheap, simple, and durable, and adapted to dig the potatoes from the ground, separate the tops and earth therefrom, and deposit them subsequent to such separation into bags or boxes awaiting their reception at the rear end of the machine.

Various other objects and advantages of the invention will hereinafter appear, and the novel features thereof will be particularly pointed out in the claims.

Referring to the drawings, Figure 1 is a plan view of a potato-digger constructed in accordance with my invention. Fig. 2 is a longitudinal section. Fig. 3 is a side elevation. Fig. 4 is a transverse section. Fig. 5 is a detail in side elevation of one of the revolving bars and its adjuncts.

Like numerals of reference indicate like parts in all the figures of the drawings.

The oblong frame of the machine comprises two opposite longitudinal side bars or beams 1, the front halves of which are declined, as shown, and are connected by and support the shovel 2, which latter terminates in a point. The sills 1 rest upon the supporting-axle 3, which latter has mounted at its ends ground-wheels 4. Between the wheels and side sills are connected the terminals 6 of the draft-bail 7, of U shape in plan, and pivoted to the front thereof, as at 8, is the front axle 9, having ground-wheels 10. An inverted-U-shaped frame 11 rests upon the bail, and has journaled therein a windlass-shaft 12, to which are secured the upper ends of a pair of suspension-chains 13, the lower ends of the chains being connected to the upper ends of a pair of straps 14, pivoted at their lower ends to the front ends of the sills 1. One end of the shaft is provided with a crank 15, extending radially from a disk 16, annularly perforated, as shown, and adapted to be locked against rotation by means of a locking-pin 17, inserted through a perforation 18 in the frame 11 and into one of the annular series of perforations of the disk.

19 designates the driver's seat, which is located at the upper end of a pair of seat-standards 20, bolted to the draft-bail 6.

A cross-piece 22 connects the side sills 1 near the shovel, and in front of the same is a transverse shaft 23, provided at its ends with sprocket-wheels 24. A similar shaft 25 is mounted in the side sills 1 near their middles, and upon the same is mounted a pair of sprockets 26. A pair of endless chains 27 connect the sprockets 24 and 26, which chains are connected at intervals by cross-bars 28. The shaft 25 is provided at one end with a toothed gear 29, which is engaged and driven by a ring-gear 30, secured to the ground-wheel.

Mounted upon the shaft 25 between the sprocket-wheels is a series of worm-gears 31, all moving in unison and with the shaft upon which they are mounted.

32 represents a series of cylindrical bars. The forward ends are reduced, as at 33, to enter bearing-openings 34, formed in the cross-bar 22. The rear ends of the bars are provided with sockets 35, in which take and are keyed short stub-shafts 36, having worm-gears 37, agreeing in number with and resting upon the worm-gears 31, through the medium of which they are driven. The tumbling or revoluble rods 32 are arranged in a parallel series a slight distance apart, the intervening spaces being maintained open and unclogged by depending clearing-lugs 38, secured to the under surfaces of the cross-bars 28. Beyond the worm-gears 37 the stub-shafts are reduced to form bearings 38, which enter openings 39 in a cross-bar 40.

Below the shaft 25 there is journaled in the opposite sills 1 a shaft 41, provided near its ends with small sprockets 42. At the rear extremity of the side sills is a shaft 43, provided with sprockets 43*, connected to the sprockets 42 by opposite endless chains 44. One end of each of the shafts 42 and 25 has an outer operating-sprocket 45, which is connected by a chain 46, whereby the rear shaft 42 is driven and with it the chains 44 and their connecting-bars 47, the sprockets 42, and their shaft 41.

48 represents a stationary or fixed sieve or screen located in rear of the rolling screen 32 and flush with the upper portion of endless carrier, the said screen being composed of a horizontal series of L-shaped bars or rods 49.

In rear of the screen there is located a box or potato-receptacle 50, the same being removably suspended in position by opposite pairs of suspension-straps 51, the lower ends of which are bent to form hooks 52, engaging eyes 53, located upon the ends of the said receptacle.

In rear of the screen 48 and above the receptacle 50 there are secured to the opposite sills 1 opposite inclined delivery-screens 54, each screen being composed of a series of bars spaced apart and connected.

In operation the potatoes are engaged and elevated by the shovel and passed over the apron 55, together with the dirt and tops, to the revolving screen 32, over which the endless carrier 27 is constantly moving. The apron 55, it will be observed, is hinged to the rear edge of the shovel, so that no clogging can occur. While upon the revolving screen 32 the potatoes are rolled from one side of the screen to the other, which tends to loosen all dirt adhering thereto, which dirt falls to the ground through the opening between the rolls. The potatoes pass from the revolving screen onto the stationary screen 48, over which it is carried by the endless chain 44 and its cross-bars, during which time the dirt loosened by the revolving screen is permitted to fall therethrough. During the passage of the potatoes over the screens the tops have been separated therefrom, and what do not pass out between the rolls 32 are carried by the cross-bars of the endless apron or carrier at the rear end of the machine over the receptacle 50, into which the potatoes drop over the rear end of the machine. An apron 55 has its front edge hinged to the rear edge of the shovel, and its rear end rests loosely upon the chains 25 and their connecting-bars, so that the potatoes are thereby guided to the endless apron.

Having thus described my invention, what I claim is—

1. In a potato-digger, the combination, with a screen composed of a series of bars journaled at their ends in the frame-work, and an endless carrier arranged upon the screen, of mechanism for simultaneously rotating the bars or rolls of the screen and moving the endless carrier, substantially as described.

2. In a potato-digger, the combination, with the frame-work, the axle and ground-wheels, and a gear mounted upon one of said wheels, of a series of revoluble bars or rolls mounted parallel to each other in the frame and provided near one of their ends with worm-gears, a shaft journaled in the frame under the gears, a gear-wheel on the shaft engaging the master-gear secured to the wheel, and a series of worm-gears upon the axle and engaging the gears of the rolls, substantially as specified.

3. In a potato-digger, the combination, with the frame-work having the axle, its ground-wheels, one of which carries a master-gear, a shaft located near above the axle and near the front end of the frame, opposite sprockets mounted thereupon, sprocket-chains connecting the wheels, and transverse bars connecting the chains, front and rear bearing-bars, a series of longitudinally-disposed rotating bars mounted therein, and provided with worm-gears, a series of worm-gears mounted upon the rear sprocket-shaft and engaging those gears of the rods, and a pinion mounted upon the said shaft and engaging the master-gear, substantially as specified.

4. In a potato-digger, the combination, with the oblong frame, the front half of which is inclined downwardly, a shovel formed at the front end of the same, the supporting-axle journaled in the frame, and ground-wheels mounted thereon, one of which carries a master-gear, of the endless carriers operated by the gear, the U-shaped draft-bail, the terminals of which are journaled upon the axles, the front axle, the inverted-U-shaped supporting-frame, the windlass-shaft journaled therein and provided at one end with an annularly-perforated plate, the perforations of which register with a perforation in the frame, a pin for locking the same, a crank connected to the wheel, a pair of chains depending from the windlass-shaft, and a pair of straps connected to the chains and at their lower ends to the front end of the oblong frame of the machine, substantially as specified.

5. In a potato-digger, the combination, with the revoluble rods 32, terminating at their ends in sockets, of the short shafts rigidly mounted in the sockets, terminating at their outer ends in bearing-studs and provided with worm-gears, the cross-bar 40, having bearings for the studs, and the shaft 25, having a series of worm-gears engaging the said worm-gears, substantially as specified.

6. In a potato-digger, the combination, with the frame, the shafts 23, 25, 41, and 42, the pairs of sprockets mounted on the ends of the pairs of shafts 23, 25, 41, and 42, the endless chains connecting the opposite pairs of sprockets on the two former, and two latter shafts and the bars connecting the chains, the axle and ground-wheels, one of which carries a master-gear, a sprocket and a gear mounted on the shaft 25, and intermediate worm-gears also mounted upon the said shaft, of the end gear meshing with the master-gear, a driving-sprocket mounted upon the end of the shaft 24, and a chain connecting the end sprockets of the revolving rods 32, terminating in bearing-studs, the bearing-bars 22 and 40, the worm-gears mounted on the ends of the said bars and engaging the worm-gears of the shaft 25, the rearwardly-disposed L-shaped bars 49, forming a fixed screen 48, and a receptacle 50, removably mounted in position thereunder, substantially as specified.

GEORGE ARTHUR ELLSWORTH.

Witnesses:
J. C. JOHNSON,
GEO. W. GARST.